United States Patent [19]
Richard

[11] Patent Number: 5,927,332
[45] Date of Patent: Jul. 27, 1999

[54] FLUID DISPENSING DEVICE INCLUDING AT LEAST ONE REMOTE-CONTROLLED MOTOR, PARTICULARLY A WATER MIXING VALVE

[76] Inventor: Jean-Claude Richard, Croisille-le-Bourg, F-61230 Gace, France

[21] Appl. No.: 08/913,957
[22] PCT Filed: Mar. 28, 1996
[86] PCT No.: PCT/FR96/00466
§ 371 Date: Apr. 23, 1998
§ 102(e) Date: Apr. 23, 1998
[87] PCT Pub. No.: WO96/30680
PCT Pub. Date: Oct. 3, 1996

[30] Foreign Application Priority Data

Mar. 29, 1995 [FR] France .................................. 95 03703

[51] Int. Cl.$^6$ ..................................................... F16K 11/00
[52] U.S. Cl. ......................... 137/625.4; 137/607; 251/331
[58] Field of Search .................................. 137/625.4, 898, 137/607; 251/331

[56] References Cited

U.S. PATENT DOCUMENTS 4,662,399  5/1987  Buchner et al. ................. 137/625.4 X
5,398,725  3/1995  Nohajawa et al. .................. 251/331 X

*Primary Examiner*—John Fox
*Attorney, Agent, or Firm*—Armstrong, Westerman, Hattori, McLeland & Naughton

[57] ABSTRACT

The device for distributing a "secondary" fluid resulting from a mixture of at least two "primary" fluids is of the kind comprising a body in two parts separated by a flexible sealing-tight wall, connected at one side to "inlet" ducts, each for one of the primary fluids, and an "outlet" duct for the secondary fluid, the ducts all communicating with one another via a mixing chamber and each comprising a means for monitoring the flow rate of fluid which they contain, the means being situated on the other side of the flexible sealing-tight wall and controlled by drive means.

12 Claims, 3 Drawing Sheets

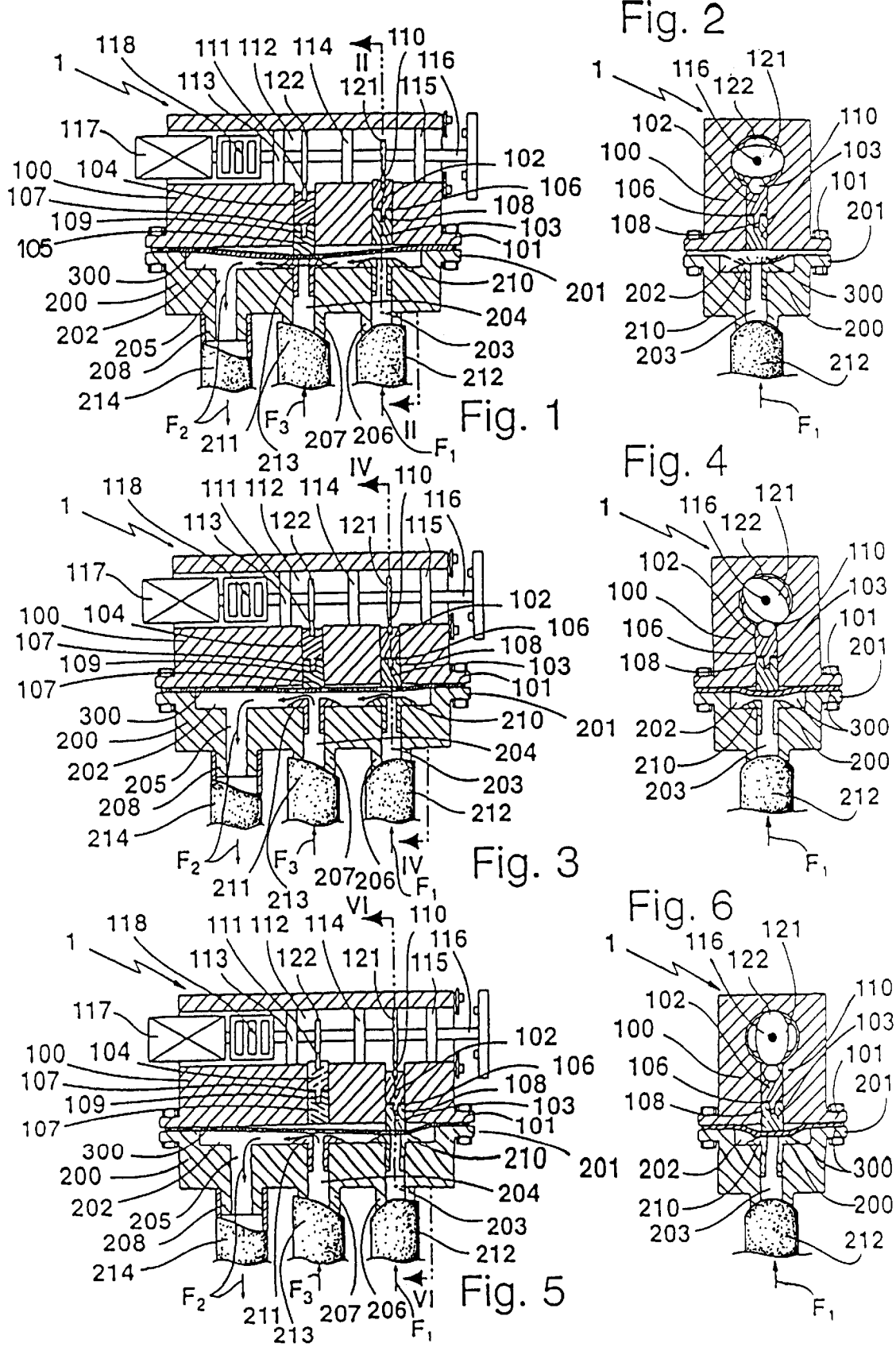

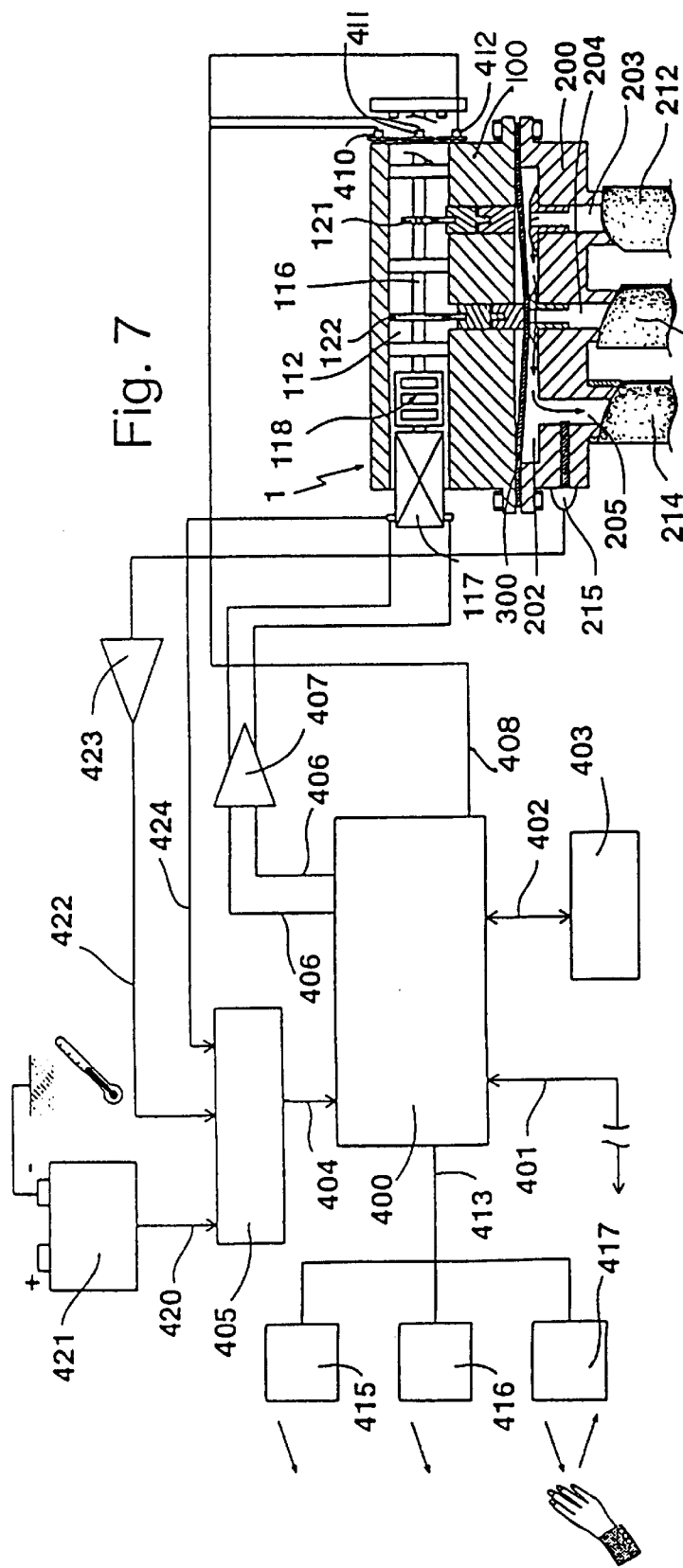

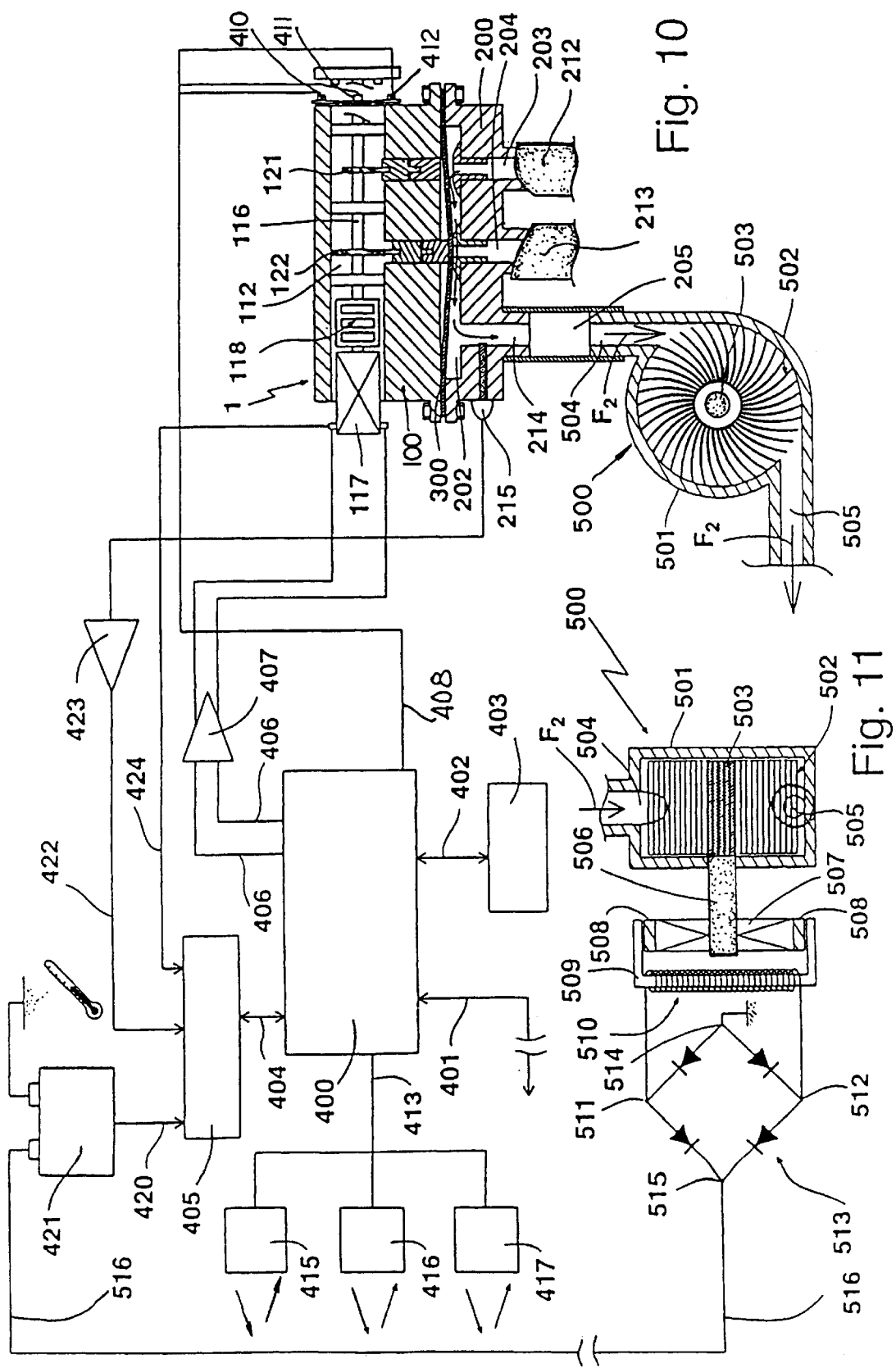

FLUID DISPENSING DEVICE INCLUDING AT LEAST ONE REMOTE-CONTROLLED MOTOR, PARTICULARLY A WATER MIXING VALVE

There are many existing devices for distributing a fluid obtained from at least two others. Since the fluid results from the two others, they are called "primary fluids" whereas the resulting fluid is called the "secondary fluid".

The fluids in question can be gases, liquids or comparable products such as powder, meal, granules or other materials described as "flowing".

Gas mixtures are necessary in all kinds of industries which need not be cited, and are sometimes essential for the biological needs of man, for example:

- specific respiratory mixtures for immersion of man in a hostile medium, for example underwater diving, work in dangerous atmospheres, space travel, etc.,
- a respiratory gas during life-saving or resuscitation or intensive-care operations, and
- mixtures for anaesthetising patients during surgical intervention.

Mixtures of liquids are also very common, inter alia for continuous metering of separate components.

The secondary fluid is not always the actual mixture of the primary fluids, since it may be desirable to eliminate one primary fluid completely and/or to use only one pure primary fluid while reserving the possibility of making relatively fine variations in the proportions of the mixture.

This is the case in particular when the device is a mixer or shower mixer for hot and cold water, since the user often wants cold water alone or hot water alone, in addition to the various intermediate proportions.

Many existing commercial devices are manually operated and, in the case of mixers or shower mixers, the most elaborate conventional model comprises a control means graduated in degrees Celsius and enabling the user to display the desired temperature, which is maintained irrespective of the flow rate of the distributed water.

One existing idea is to make these devices more convenient, inter alia by providing them with controls which are relatively automatic, thus replacing manual control by mechanical, that is motor-driven, control.

As is known, however, it is very awkward for a single mechanical assembly to contain electrical energy and conductive liquids which also have very negative physical and chemical effects such as corrosion, oxidation and furring, leaks resulting from short-circuits and the risk of electrocuting the user.

Attempts have therefore been made to improve these devices by making them not only more convenient but also more reliable by maximum insulation of the electric energy, both in order to preserve the actual devices and to protect users.

To this end, one idea already has been remote control of the devices in order to eliminate any physical contact between them and users, particularly when the device is used on sanitary installations such as shower compartments and baths, since the user will then be in a very dangerous situation since a wet body is highly conductive and electrocution under these conditions may be fatal.

To give an idea of the state of the art, the following documents may be cited:

FR-A-2 586 782, which describes a shower mixer comprising a motor-driven adjusting mechanism connected directly to a component which monitors the flow rate of water, thus requiring a number of sealing-tight passages between a part of the mixer in which water flows and a part of the mixer connected to electric conductors.

FR-A-2 463 343 is of the same kind as the preceding, that is a passage which needs to be made sealing-tight enables a mechanical transmission means to move from a water-containing part to an electrically energised part.

DE-A-4 014 849 describes a kitchen sink provided with solenoid valves for monitoring inflowing of water and emptying of the sink, using a number of motors controlled by keys disposed at the edge of the sink. By nature, solenoid valves are mechanisms which open and close a passage for liquid, using a motor energised by electrical energy.

The invention departs from these solutions and can be used for constructing a device in which the parts associated with the fluids are physically separate from the parts associated with the use of electric energy, the device also being remote-controllable without any contact between the user and the device.

To this end, the invention relates to a device for distributing a "secondary" fluid obtainable from a mixture of at least two "primary" fluids and of the kind comprising a body in two parts separated by a sealing-tight flexible wall connected on one side to "inlet" ducts, each for one primary fluid, and a "outlet" duct for the secondary fluid, all the ducts communicating with one another via a mixing chamber and each comprising a means for monitoring the flow rate of the fluid which they contain, the means being situated on the other side of the sealing-tight flexible wall and controlled by drive means, characterised in that each monitoring means, in addition to the flexible sealing-tight wall, on the one hand comprises an individually movable component situated on one side of the said flexible sealing-tight wall in line with the ends of each inlet duct situated on the other side of the said flexible sealing-tight wall, and on the other hand comprises one individual cam for each moving component, the cams being kinematically connected to guide means which are always in contact with the moving components either directly or via interposed components and are kinematically connected to one another so that any motion imparted to one by the drive means corresponds to simultaneous motion by the other.

According to other features of the invention:

- each moving component comprises a piston which engages in a guide cylinder and is disposed opposite a cam keyed to a shaft kinematically connected to the motor;
- the piston is formed from two superposed coaxial parts with interposition of a spring;
- one of the two parts of the piston has a longitudinal prolongation which slides freely in a correspondingly shaped and dimensioned recess formed in the other part;
- a ball bearing is mounted for pivoting and partly fits into a semi-circular recess in the piston, in order to be interposed between the said piston and the corresponding cam;
- the shaft kinematically connected to the motor bears at least one ball bearing for guidance when pivoting;
- the device comprises a microprocessor connected on the one hand to an electric circuit for energising and controlling the drive means and on the other hand to means for monitoring operation of the assembly;
- the means for monitoring operation of the assembly comprise at least one pick-up of the position of the means for monitoring the flow rate of primary fluids;

the monitoring means comprise at least one pick-up of a physical characteristic of the secondary fluid, such as its temperature;

the microprocessor comprises at least one receiver of control signals transmitted by remote control means;

the remote control means comprise at least one infra-red radiation pick-up;

the electric energy required for the device is at least partly supplied by a turbine inserted on the outlet duct and associated with a DC generator connected to a connection which terminates at a battery.

The invention will be more clearly understood from the following detailed description with reference to the accompanying drawings. Of course, the description and drawings are given only by way of indicative, non-limitative example.

FIG. 1 is a diagrammatic view in section of an embodiment of the device according to the invention, intended for two primary fluids and one secondary fluid and shown in the situation where one of the two inlets is completely blocked and the other completely free;

FIG. 2 is a diagrammatic view in section along line II—II in FIG. 1;

FIG. 3 is a diagrammatic view in section of an embodiment of a device according to the invention intended for two primary fluids and a secondary fluid and shown in the situation where the two inlets are partially open;

FIG. 4 is a diagrammatic view in section along line IV—IV in FIG. 3;

FIG. 5 is a diagrammatic view in section of an embodiment of a device according to the invention, designed for two primary fluids and one secondary fluid and shown in the situation where the other inlet is completely blocked and the first is completely free;

FIG. 6 is a diagrammatic view in section along line VI—VI in FIG. 5;

FIG. 7 is a diagram illustrating an embodiment of the means for controlling and adjusting the device in FIGS. 1 to 6;

FIG. 8 is a diagrammatic view of the general shape of the cams for acting on the means for monitoring the flow rate of fluids;

FIG. 9 is a diagram illustrating the operating cycles of the cams in FIG. 8;

FIG. 10 is a diagram illustrating an embodiment of the invention in which the device is self-contained, the electric energy for operating the motor being provided by a turbine driven by the outflowing stream of secondary fluid, and FIG. 11 is a diagrammatic view of the turbine in FIG. 10 and the associated electric circuit.

As can be seen from the drawings, the device shown is for constructing a shower mixer which receives cold water (the first "primary liquid") and hot water (the second "primary liquid") and on demand supplies either cold water alone or hot water alone or a mixture of these two (secondary liquid).

The device has a substantially cuboidal body 1 divided into two superposed parts 100, 200 separated by a flexible sealing-tight wall 300 comprising a resilient diaphragm secured at its periphery by flanges 101, 201 of any known kind.

The bottom part 200 has a cavity 202 into which three passage 203, 204, 205 open, the passages being prolonged by three tubular nozzles 206, 207 and 208.

The passages 203, 204 have convex seats 210, 211 respectively and the corresponding nozzles 206 and 207 receive "inlet" ducts 212 and 213, one being connected to a source of cold water and the other to a source of hot water.

The passage 205 remains free and its nozzle 208 is connected to an "outlet" duct 214.

Pistons are disposed opposite seats 210 and 211 but on the other side of the diaphragm 300, that is in the part 100, each piston being formed from two superposed parts 102–103 and 104–105 respectively, between which springs 106 and 107 are disposed.

The springs 106, 107 constitute a force limiter and permanently urge parts 102, 103 and 104, 105 respectively apart but, whatever the distance between the said two parts of each piston, they are always held in alignment by a cylindrical prolongation 108–109 of the upper parts 102 and 104, which slides in a recess formed on the top of the lower parts 103 and 105.

Each upper part 102, 104 has a hemispherical groove in which a ball bearing 110–111 is fitted so as to rotate around its axis.

The part 100 of the body 1 is formed with a bore 112 which contains three ball bearings 113, 114 and 115 for a shaft 116 kinematically connected to the output shaft of an electric motor 117 via a known clutch 118.

The ball bearings 110, 111 of the pistons extend radially in the bore 112 and are in contact with two cams 121, 122 keyed to the shaft 116.

FIGS. 2, 4 and 6 diagrammatically show the cams 121, 122 in the form of two offset ovals. In reality, however, the shape of the cams is more complex and will be described hereinafter with reference to FIGS. 8 and 9.

The device which has been described operates as follows:

It is assumed that the starting situation is the inoperative situation, that is when the device is not delivering water. The motor 117 has been started and stopped in a position such that the cams 121, 122 are stationary and rest on the ball bearings 110, 111 which rest on the upper parts 102, 104 of the pistons; the springs 106, 107 are compressed to an extent varying with the force to which they are subjected, and the bottom parts 103, 105 of the pistons press the diaphragm 300 against the seats 210 and 211, so that the central passages of the said seats 210, 211 are blocked in sealing-tight manner since the diaphragm 300 is resilient.

Consequently, neither cold water nor hot water enters the mixing chamber 202.

If the user wants cold water only, he must start the motor 117 so as to rotate the cams 121 and 122 which are shaped, as explained hereinafter, so that the seat 211 remains blocked by the diaphragm 300 pressed by the piston 104–105 and the cam 122, whereas the seat 210 is released since the cam 121 has allowed the piston 102–105 to rise when pushed by the resilient return of the diaphragm 300 and the pressure of cold water arriving through the inlet duct 212 in the direction of arrow F1.

The cold water enters the mixing chamber 202 under the diaphragm 300, flows round the closed seat 211 and reaches the outlet duct 214 and is discharged through it in the direction of arrow F2.

The flow rate of cold water in the direction of arrows F2 is adjusted by cam 121, which allows the diaphragm 300 to rise to a varying extent above the seat 210 in order to vary the flow cross-section.

If the user wants warm water, that is a mixture of cold water and hot water, he must start the motor 117 in order to rotate the cams 121, 122 to their angular position corresponding to simultaneous opening of seats 210 and 211 (FIG. 3) by variously raising the pistons 102–103 and 104–105.

The outflow rate of hot water is adjusted by the cam 122, which allows the diaphragm 300 to rise to a varying extent above the seat 211 in order to vary the flow cross-section.

Of course, the flow cross-section for cold water can be adjusted independently of hot water, so as to vary the total outflow rate and obtain a proportion of cold water to hot water corresponding to the desired temperature, as will be explained hereinafter.

The cold water arrives at the mixing chamber 202 in the direction of the arrow F1, as stated hereinbefore, where it meets the hot water entering the mixing chamber 202 via the inlet duct 213 in the direction of the arrow F3 and via the seat 211. The mixture reaches the outlet duct 214, through which it is discharged in the direction of arrow F2.

If the user wants hot water only, he must rotate the motor 117 so as to rotate the cams 121 and 122 so as to block the seat 210 and open the seat 211, this position being shown in FIGS. 5 and 6.

The motor 117 must be started and stopped in accordance with the position of cams 121 and 122 in a simple, convenient manner in order to prevent fumbling and errors in manipulation.

FIG. 7 shows an embodiment of a circuit for automatically monitoring the various operations of the device and also providing the user with a remote-control system avoiding any contact with the device.

The circuit comprises a microprocessor 400 which receives information and sends control signals. To this end it receives:
- a series connection 401 to a computer (not shown) for programming the microprocessor 400,
- a connection 402 to a memory 403 for storing the program data and thus safeguarding the parameters thereof (the program can be re-parametered or not, depending on the applications);
- a connection 404 to an analog/digital converter 405 for receiving information as described hereinafter;
- a double connection 406 to the inputs of a functional amplifier 407 governing the motion of motors 117 and the clutch 118;
- a connection 408 to three Hall-effect pick-ups 410, 411 and 412 for determining the main angular positions of the cams 121 and 122, and
- a connection 413 to infra-red radiation pickups 415, 416 and 417.

The analog/digital converter 405 has three connections, one connection 420 to a battery 421, one connection 422 via an amplifier 423 to a heat probe 215 placed near the outlet duct 205, and one connection 424 to a speed indicator (not shown) for permanently measuring the speed of the motor 117.

The pick-ups 415, 416 and 417 are infra-red radiation transmitters and receivers of known kind and are controlled by simple approach of one hand (as shown) or even of a finger.

In practice, this action by the user can of course be obtained by other means within the scope of the skilled man.

The infra-red radiation pick-ups are each intended for one operation, as follows:
- the pick-up 415 is designed simply to provide the microprocessor 400 with signals corresponding to starting or stopping of the device;
- the pick-up 416 is adapted to provide the microprocessor 400 with signals corresponding to variable opening of the seat 211, that is to the arrival of hot water in the mixing chamber 202, and
- the pick-up 417 is adapted to provide the microprocessor 400 with signals corresponding to variable opening of the seat 210, that is to arrival of cold water in the mixing chamber 202.

The flow rate in the outlet duct 205 and the proportion of hot and cold water are regulated by the set of cams 121 and 122.

As shown in FIG. 8, the two cams 121, 122 have corresponding shapes in order to obtain all possible combinations of temperature between that of cold water only and that of hot water only.

The cams 121 and 122 are positioned on the assumption that the part thereof acting on the corresponding ball bearings 110–111 is the bottom (or "south") part situated at 180° relative to the top part (or "north") part situated at 0–360°, the right and left ends of the horizontal diameter being at 90° ("east") and 270° ("west") respectively.

With regard to cam 121, it can be seen that, relative to the circumscribed circle α, it comprises an arc of a circle a1 in the south-east quarter-circle between 90° and 180°, indicating that a first rotation through a quarter-turn of the shaft 116 in the direction of arrow F4 will bring the "east" point of the cam 121 to the "south", where the cam acts on piston 102–103, and will not have any effect on the position of the said piston 102–103, which will consequently be held in the low position for closing the seat 210, as indicated by the digit "0", signifying that the flow rate of cold water is zero.

With regard to cam 122, during the same "south-east" quarter-circle it has a curve b1 which extends from the end of the radius of the circumscribed circle α to a distance equal to half the radius of the said circle α, signifying that the same first quarter-turn rotation of shaft 166 in the direction of arrow F4 will bring the "east" point of the cam 122 to the "south", where the cam 122 acts on piston 104–105, and will enable the piston 104–105 to rise to a height equal to half the radius of the circle α, in which position the diaphragm 300 is completely raised, the seat 211 is completely open, and the flow rate of hot water is at a maximum. This complete opening is indicated by "1".

Consequently this first quarter-turn rotation of the shaft 116, starting from the position of the cams 121 and 122 in FIG. 8, keeps the seat 210 closed and completely opens the seat 211.

Consequently water flows out through duct 214 at the temperature of the hot water supplied at the inlet duct 213 (minus losses), since the cold water inlet is completely blocked.

The arc of a circle a1 is continued by a curve a2 which extends from the end of the radius of the circumscribed circle α to a distance equal to a quarter of the said radius measured from the circumference of the circle α, indicating that a second quarter-turn rotation of shaft 116 brings the "north" point of the cam 121 to the "south", thus partly raising the piston 102–103 and enabling the diaphragm 300 to release the seat 210 and obtain a flow cross-section corresponding to a fraction of the cold water flow rate of approximately 50% of the total flow rate, indicated by "½".

The curve b1 of cam 122 is continued by a curve b2 which extends from curve b1 to a distance equal to a quarter of a radius of the circumscribed circuit a measured from the circumference thereof, indicating that the said second quarter-circle rotation which brought the "north" point of cam 121 to the "south" likewise brings the "north" point of cam 122 to the "south" and thus lowers the piston 104–105 and causes the diaphragm 300 to reduce the hot-water flow cross-section by half.

The curve a2 of cam 121 is continued by a curve a3 which extends from curve a2 to a distance equal to half the radius of the circumscribed circle α, thus showing that a third rotation of shaft 116 in the direction of arrow F4 brings the "west" point of cam 121 to the "south", thus raising the piston 102–103 again and thus moving the seat 210 from a half-open position indicated by "½" to a completely open position indicated by "1".

The curve b2 of cam 122 is prolonged by a curve b3 which extends from curve b2 to the circumscribed circle α, indicating that the third rotation of shaft 116 in the direction of arrow F4 brings the "west" point of cam 122 to the "south", thus again lowering the piston 104–105 and moving it from a half-open position indicated by "½" to a completely closed position indicated by "0".

Finally, curve a3 of cam 121 is continued by a curve a4 which extends from curve a3 to the circumscribed circle α, indicating that a fourth rotation of shaft 116 in the direction of arrow F4 brings the "south" point of cam 121 to the original "south" after a complete revolution, thus lowering the piston 102–103 and thus moving the seat 211 from a completely open position indicated by "1" to its completely closed position indicated by "0", the starting point of the arc of a circle a1 and the beginning of the cycle which has just been described.

The curve b3 of cam 122 is continued by an arc of a circle b4 which extends from curve b3 to the beginning of curve b1, indicating that the fourth rotation of shaft 116 in the direction of arrow F4 brings the "south" point of cam 122 to the original "south" after a complete revolution, which will have no effect on the position of piston 104–105, which will therefore be kept in its low position for closing the seat 211, indicated by the digit "0", signifying that the flow rate of hot water is zero.

The shaft 116 driven by the motor 117 and clutch 118 pivots the two cams 121 and 122 simultaneously and, as can be seen, the two circles are different but coordinated as diagrammatically shown in FIG. 9.

The ordinate shows the amplitude of the swing or excursion permitted by the cams, measured from 0 to 1, the swing corresponding to the amplitude of the travel of pistons 102–103 and 104–105 and to the variable opening of the seats 210 and 211.

The abscissa is used for the evolute of the periphery of cams 121 and 122.

Line a corresponds to cam 121 and it can be seen that, starting from the origin (corresponding to the "south" or 180°) and over a 90° arc (that is a quarter-turn), cam 121 holds the piston 102–103 in the low position in which the seat 210 is blocked.

During the same quarter-turn, the line b corresponding to cam 122 shows that piston 104–105 rises and moves the seat 211 from its completely closed position to its completely open position.

As a result of this quarter-turn motion, therefore, only hot water flows, and at the maximum flow rate.

Assuming that shaft 116 continues to rotate, seat 210 will be open for a half-turn while seat 211 is closed. At the intersection of lines a and b after a quarter-turn, the two seats 210 and 211 will be in the same half-open position.

The effect of this movement through half a turn will therefore be a mixed water flow, very hot at first then increasingly cold until total closure of the hot water.

If the shaft 116 rotates through the last quarter-turn, the hot water will remain shut off and the flow rate of cold water will decrease until it stops completely, as in the starting position.

The pick-ups 410, 411 and 412 inform the microprocessor as regards the characteristic positions of the cams as follows:

complete closure of the hot and cold water inlets (pick-up 411);

complete closure of cold water and complete opening of hot water (pick-up 412), and complete closure of hot water and complete opening of cold water (pick-up 410).

Of course, the two cams 121 and 122 can be held in any intermediate position between the cardinal positions shown.

Likewise, the microprocessor 400 can rotate the motor 117 (and consequently shaft 116 and cams 121 and 122) in either direction, since the program optimises the movements from one situation to another.

FIGS. 10 and 11 show an embodiment of the invention in which the device is completely self-contained in operation, since the electric energy needed (mainly for operating the motor 117) is recovered from the energy provided by the flow of primary fluids, that is in this case by pressurising the cold water and hot water.

A turbine 500 is disposed on the outlet duct 205 and is made up of a stator 501 and a rotor 502 mounted on a rotary shaft 503 having its axis perpendicular to the axis of the said outlet duct 205, that is to the direction of flow of the secondary fluid indicated by the arrow F2.

At the outlet of body 1, the water travelling along the outlet duct 205 in the direction of arrow F2 enters the stator 501 through an inlet 504, drives the rotor 502 in rotation, and leaves the stator 501 through an outlet 505 towards the place of use.

The shaft 503 has an extension 506 outside the stator 501 and keyed to a balancing wheel 507 having a number of permanent magnets 508 on its periphery and surrounded by a conductive armature 509 associated with one or more windings 510.

The ends 511 and 512 of winding 510 are connected to a bridge of diodes 513 having one output 514 connected to earth whereas the other output 515 is connected by 516 to the battery 421. This embodiment operates as follows:

Whenever the user uses the device, water flows through the outlet duct 205 and drives the rotor 502 of turbine 500, thus driving the wheel 507 and magnets 508. In well-known manner, an alternating electric current is collected at the ends 511 and 512 and rectified by the bridge of diodes 513, so that a DC for charging the battery 421 flows through the connection 516.

Thus, the complete installation is self-contained since the necessary electric energy is supplied via the battery 421 by the turbine 500, which itself is driven by the water used.

Of course, any other form of electricity supply can be used, inter alia a low-voltage supply from cells or by transformation of the 220 V electric current usually available on the mains to current at 6, 9 or 12 V for example.

The device described comprises a single shaft 116 and two cams 121, 122 but the invention can be used for constructing devices having at least two shafts, so as to have independent cams available. This could be the case when it is desired to monitor the outflow rate of the secondary fluid or when required by the characteristics of the primary fluids.

Each shaft must be provided with an individual control means, which can be either a motor or a clutch mechanism capable of engaging the corresponding shaft or dis-engaging it relative to a common motor.

I claim:

1. A device for distributing a "secondary" fluid resulting from a mixture of at least two "primary" fluids, the device being of the kind comprising a body in two parts separated by a flexible sealing-tight wall (300), one side of which is connected to "inlet" ducts (203, 204) each for one primary fluid, and an "outlet" duct (205) for the secondary fluid, the ducts (203, 204, 205) all communicating with one another via a mixing chamber (202) and the inlet ducts (203, 204) each comprising a means (210, 211) for monitoring the flow rate of the fluid which they contain, the means being situated on the other side of the flexible sealing-tight wall (300) and controlled by driving means comprising individual cams, characterised in that each monitoring means comprises the flexible sealing-tight wall (300) and, on the one hand, an individually movable component (102–103 and 104–105) situated on one side of the flexible sealing-tight wall (300) in line with the ends of each inlet duct (203, 204) situated on the other side of the flexible sealing-tight wall (300) and, on the other hand, one individual cam (121, 122) for each moving component (102–103 and 104–105), and the individual cams (121, 122) are keyed to a common shaft, have a radius of curvature which varies continuously over at least a part of the cam periphery so as to obtain stable intermediate positions between the two extreme positions of complete opening and complete closing of the said flow-rate monitoring means, and are kinematically connected to drive means (116–117–118) which are always in contact with the moving components (102–103 and 104–105) either directly or via interposed elements (110, 111) and are kinematically connected to one another so that any motion imparted to one (121, 122) by the drive means (116–117–118) corresponds to a simultaneous motion by the other (122, 121).

2. A device according to claim 1, characterised in that each moving component comprises a piston (102–103, 104–105) which engages in a guide cylinder and is disposed opposite a cam (121–122) keyed to a shaft (116) kinematically connected to the motor (117).

3. A device according to claim 2, characterised in that the piston is made up of two superposed coaxial parts (102 and 103, 104 and 105) with interposition of a spring (106–107).

4. A device according to claim 3, characterised in that one of the two parts (102–104) of the piston has a longitudinal prolongation (108–109) which slides freely in a correspondingly shaped and dimensioned recess formed in the other part (103–105).

5. A device according to claim 2, characterised in that a ball bearing (110–111) is mounted for pivoting and fits partly into a semi-circular recess in the piston (102–104) so as to be interposed between the piston (102–104) and the corresponding cam (121–122).

6. A device according to claim 2, characterised in that the shaft (116) kinematically connected to the motor (117) carries at least one ball bearing (113–114–115) for guidance when pivoting.

7. A device according to claim 1, characterised in that it comprises a microprocessor (400) connected on the one hand to an electric circuit (406–407–423–405) for energising and controlling the drive means (117) and on the other hand to means (215, 410–411–412) for monitoring the operation of the assembly.

8. A device according to claim 7, characterised in that the means for monitoring the operation of the assembly comprise at least one pick-up (410–411–412) of the position of the means for monitoring the flow rate of the primary fluids.

9. A device according to claim 7, characterised in that the monitoring means comprise at least one pick-up (215) of a physical characteristic of the secondary fluid, such as its temperature.

10. A device according to claim 7, characterised in that the microprocessor (400) comprises at least one receiver for control signals transmitted by remote-control means.

11. A device according to claim 10, characterised in that the remote-control means comprise at least one infra-red radiation pick-up (415–416–417).

12. A device according to claim 1, characterised in that the necessary electric energy is supplied at least partly by a turbine (500) inserted in the outlet duct (205) and associated with a DC generator (506 to 513) connected to a connection (516) which terminates at a battery (421).

* * * * *